(12) United States Patent
Yamagata et al.

(10) Patent No.: US 10,244,537 B2
(45) Date of Patent: Mar. 26, 2019

(54) COMMUNICATION SYSTEM, ACCESS CONTROL APPARATUS, SWITCH, NETWORK CONTROL METHOD, AND PROGRAM

(71) Applicant: NEC Corporation, Minato-ku, Tokyo (JP)

(72) Inventors: Masaya Yamagata, Tokyo (JP); Yoichiro Morita, Tokyo (JP); Takayuki Sasaki, Tokyo (JP); Masayuki Nakae, Tokyo (JP); Kentaro Sonoda, Tokyo (JP); Yoichi Hatano, Tokyo (JP); Hideyuki Shimonishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/131,464

(22) Filed: Apr. 18, 2016

(65) Prior Publication Data

US 2016/0234848 A1     Aug. 11, 2016

Related U.S. Application Data

(63) Continuation of application No. 14/397,524, filed as application No. PCT/JP2013/062462 on Apr. 26, 2013, now abandoned.

(30) Foreign Application Priority Data

May 1, 2012   (JP) ................................ 2012-104664

(51) Int. Cl.
*H04W 24/02* (2009.01)
*H04L 29/06* (2006.01)
(Continued)

(52) U.S. Cl.
CPC ......... *H04W 72/0486* (2013.01); *H04L 63/02* (2013.01); *H04L 63/1458* (2013.01);
(Continued)

(58) Field of Classification Search
CPC .............................. H04N 7/16; H04L 41/0893
(Continued)

(56) References Cited

U.S. PATENT DOCUMENTS

| 9,148,342 B2 | 9/2015 | Numata et al. |
| 2007/0124759 A1* | 5/2007 | Otani ...................... H04L 41/26 725/25 |

(Continued)

FOREIGN PATENT DOCUMENTS

| CN | 101969786 A | 2/2011 |
| JP | 2010-541426 A | 12/2010 |

(Continued)

OTHER PUBLICATIONS

Japanese Office Action for JP Application No. 2014-513372 dated Mar. 28, 2017 with English Translation.

(Continued)

*Primary Examiner* — Iqbal Zaidi

(57) ABSTRACT

A communication system includes: a control apparatus setting control information in a forwarding node(s); a forwarding node(s); and an access control apparatus. The forwarding node(s) forwards packets by using first control information set by the control apparatus and second control information for forwarding packets that do not match a matching condition(s) in the first control information set by the control apparatus from a predetermined port of the forwarding node(s). The access control apparatus includes a determination unit determining whether to generate control information for the packets forwarded from the predetermined port of the forwarding node(s) and requesting the control apparatus to generate control information.

16 Claims, 13 Drawing Sheets

(51) Int. Cl.
*H04W 72/04* (2009.01)
*H04W 72/02* (2009.01)
*H04W 40/12* (2009.01)
*H04W 72/00* (2009.01)

(52) U.S. Cl.
CPC ........... *H04W 24/02* (2013.01); *H04W 40/12* (2013.01); *H04W 72/02* (2013.01); *H04W 72/00* (2013.01); *H04W 72/04* (2013.01)

(58) Field of Classification Search
USPC ..................................... 370/252–339; 725/25
See application file for complete search history.

(56) References Cited

U.S. PATENT DOCUMENTS

| | | |
|---|---|---|
| 2008/0189769 A1 | 8/2008 | Casado et al. |
| 2010/0310750 A1 | 12/2010 | She et al. |
| 2012/0044935 A1 | 2/2012 | Hama et al. |
| 2012/0137375 A1* | 5/2012 | Ramachandran ... G06F 21/6218 726/28 |
| 2012/0195318 A1 | 8/2012 | Numata et al. |
| 2013/0169418 A1* | 7/2013 | Seo ..................... G06K 7/0008 340/10.1 |
| 2013/0176888 A1 | 7/2013 | Kubota et al. |
| 2015/0350026 A1 | 12/2015 | Numata et al. |

FOREIGN PATENT DOCUMENTS

| | | |
|---|---|---|
| NO | 2011/043416 A1 | 4/2011 |
| WO | 2011/030490 A1 | 3/2011 |
| WO | 2011/081104 A1 | 7/2011 |
| WO | 2012/049960 A1 | 4/2012 |

OTHER PUBLICATIONS

Nick McKeon et al., "OpenFlow: Enabling Innovation in Campus Networks", Mar. 14, 2008, [Internet] <URL: http://www.openflow.org/documents/openflow-wp-latest.pdf>, pp. 1-6.
"OpenFlow Switch Specification", Ver. 1.1.0 Implemented (Wire Protocol 0x02), Feb. 28, 2011, [Internet] <URL: http://www.openflow.org/documents/openflow-spec-v1.1.0.pdf>, pp. 1-56.
Yasuhiro Yamasaki et al., "Campus VLAN system based on OpenFlow", The Institute of Electronics, Information and Communication Engineers, Technical Report of IEICE, CQ2011-26, Jul. 2011, pp. 43-48, with English Abstract.
Takeshi Miyasaka et al., "Concept and Implementation of an ATCA-based Open Architecture Router", The Institute of Electronics, Information and Communication Engineers, Technical Report of IEICE, Feb. 2005, with English Abstract.
International Search Report for PCT Application No. PCT/JP2013/062462, dated Aug. 6, 2013.
Chinese Office Action for CN Application No. 2010380023070.2 dated Sep. 18, 2016 with English Translation.

* cited by examiner

FIG. 4

| MATCHING CONDITIONS Match Fields | | | STATISTICAL INFORMATION Counters | PROCESSING CONTENTS Instructions |
|---|---|---|---|---|
| Src IP<br>ANY | Dst IP<br>ANY | TCP/UDP dst port<br>ANY | 0000 | FORWARDING TO CONTROL TARGET PACKET EXTRACTION UNIT OF CONTROLLER (FORWARDING FROM PORT PP) |

FIG. 5

| SOURCE | DESTINATION | ACCESS AUTHORITY |
|---|---|---|
| 192.168.100.1 | 192.168.0.1 | allow |
| 192.168.100.2 | 192.168.0.1 | deny |
| 192.168.0.1 | 192.168.100.1 | allow |
| .. | .. | .. |

FIG. 7

| MATCHING CONDITIONS Match Fields | STATISTICAL INFORMATION Counters | PROCESSING CONTENTS Instructions |
|---|---|---|
| Src IP 192.168.100.1  Dst IP 192.168.0.1  TCP/UDP dst port 80 | 0000 | FORWARDING TO NEXT HOP (FORWARDING FROM PORT P1) |
| Src IP ANY  Dst IP ANY  TCP/UDP dst port ANY | 0000 | FORWARDING TO CONTROL TARGET PACKET EXTRACTION UNIT OF CONTROLLER (FORWARDING FROM PORT PP) |

FIG. 10

| MATCHING CONDITIONS Match Fields | | | STATISTICAL INFORMATION Counters | PROCESSING CONTENTS Instructions |
|---|---|---|---|---|
| Src IP ANY | Dst IP 192.168.0.1 | TCP/UDP dst port ANY | 0000 | FORWARDING TO ACCESS CONTROL APPARATUS 20A (FORWARDING FROM PORT PP1) |
| Src IP ANY | Dst IP ANY | TCP/UDP dst port ANY | 0000 | FORWARDING TO ACCESS CONTROL APPARATUS 20B (FORWARDING FROM PORT PP2) |
| .. | | | .. | .. | form
COMMUNICATION SYSTEM, ACCESS CONTROL APPARATUS, SWITCH, NETWORK CONTROL METHOD, AND PROGRAM

CROSS-REFERENCE TO RELATED APPLICATIONS

The present application is a continuation application of U.S. patent application Ser. No. 14/397,524 filed on Oct. 28, 2014, which is a National Stage Entry of International Application PCT/JP2013/062462, filed on Apr. 26, 2013, which claims the benefit of priority from Japanese Patent Application 2012-104664 filed on May 1, 2012, the disclosures of all of which are incorporated in their entirety by reference herein.

TECHNICAL FIELD

The present invention relates to a communication system, an access control apparatus, a switch, a network control method, and a program. In particular, it relates to: a communication system including a controller that controls switches in a centralized manner; an access control apparatus; a switch; a network control method; and a program.

BACKGROUND

In recent years, a network referred to as OpenFlow has been drawing attention (see Patent Literature 1 and Non-Patent Literatures 1 and 2). OpenFlow adopts a centralized-control-type network architecture in which a control apparatus called an OpenFlow controller controls behavior of switches called OpenFlow switches. More specifically, the OpenFlow controller can perform fine-grained path control by setting flow entries that define matching conditions specifying ingress ports and headers in layers 2 to 4 and that define processing contents in OpenFlow switches.

In addition, in order to integrally manage security and service quality in a network system, a network management system (NMS) and a policy server are used.

Patent Literature 1 discloses a management method used for a network managed in a centralized manner by a network manager. Paragraphs 0031 to 0032 in Patent Literature 1 describe that switches in the network operate in the same way as the above OpenFlow switches. In addition, the end of paragraph 0031 describes that a packet matching multiple flow header entries is assigned to the highest priority flow entry. Namely, the end of paragraph 0031 describes that a rule such as longest match can be used.

PATENT LITERATURE (PTL)

Patent Literature 1

Japanese Unexamined Patent Application Publication No. 2010-541426A

NON-PATENT LITERATURE (NPL)

Non-Patent Literature 1

Nick McKeown, and seven others, "OpenFlow: Enabling Innovation in Campus Networks," [online], [searched on Mar. 14, 2012], Internet <URL: http://www.openflow.org/documents/openflow-wp-latest.pdf>

Non-Patent Literature 2

"OpenFlow Switch Specification" Version 1.1.0 Implemented (Wire Protocol 0x02) [online], [searched on Mar. 14, 2012], Internet <URL:http://www.openflow.org/documents/openflow-spec-v1.1.0.pdf>

SUMMARY

The following analysis has been given by the present inventors. In a centralized-control-type communication system as represented by OpenFlow in Non-Patent Literatures 1 and 2, when a large amount of packet communication or fine-grained access control is performed, the number of queries transmitted to a control apparatus (corresponding to the OpenFlow controller in Non-Patent Literatures 1 and 2) that controls devices in a centralized manner is increased. As a result, the load on the control apparatus is increased, counted as a problem. In addition, forwarding nodes (corresponding to OpenFlow switches in Non-Patent Literatures 1 and 2 and to network elements in Patent Literature 1) controlled by the control apparatus have limitations on the number of flow entries that can be stored therein and on processing performance of the CPUs (Central Processing Units). In addition, if a received packet does not match any flow entry, communication with the control apparatus needs to be performed. Thus, when the control apparatus receives a large number of packets or performs fine-grained access control, the control apparatus may not be able to provide intended performance.

In particular, if TLS/SSL (Transport Layer Security/Secure Sockets Layer) is used for a secure channel between a switch and the control apparatus, the above tendency becomes more significant, which could result in packet delay, for example.

As countermeasures against these problems, for example, load balancing achieved by arranging a plurality of control apparatuses has been considered. However, if the number of forwarding nodes to be controlled, the number of terminals connected to these forwarding nodes, and the number of kinds of services handled by each terminal are increased, flow entries that correspond to a large number of packets to be processed are needed. Consequently, a rapid increase in queries to the control apparatus is unavoidable. Thus, fundamental countermeasures are being demanded.

An object of the present invention is to provide a communication system, an access control apparatus, a forwarding node, a network control method, and a program capable of suppressing an increase in the load on a control apparatus and a switch and allowing the control apparatus and the switch to provide intended performance even if a large amount of packet communication or fine-grained access control is performed.

According to a first aspect, there is provided a communication system, comprising: a control apparatus setting control information in a forwarding node(s); a forwarding node(s) forwarding packets by using first control information set by the control apparatus and second control information for forwarding packets that do not match a matching condition(s) in the first control information set by the control apparatus from a predetermined port of the forwarding node(s); and an access control apparatus comprising a determination unit determining whether to generate control information for the packets forwarded from the predetermined port of the forwarding node(s) and requesting the control apparatus to generate control information.

According to a second aspect, there is provided an access control apparatus, arranged in a communication system comprising: a control apparatus setting control information in a forwarding node(s); and a forwarding node(s) forwarding packets by using first control information set by the control apparatus and second control information for forwarding packets that do not match a matching condition(s) in the first control information set by the control apparatus from a predetermined port of the forwarding node(s) and comprising a determination unit determining whether to generate control information for the packets forwarded from the predetermined port of the forwarding node(s) and requesting the control apparatus to generate control information.

According to a third aspect, there is provided a forwarding node, connected to a control apparatus setting control information in the forwarding node, wherein first control information set by the control apparatus and second control information are set, the second control information being for forwarding packets that do not match a matching condition(s) in the first control information set by the control apparatus from a predetermined port of the forwarding node; and wherein the forwarding node forwards, when receiving packets that match a matching condition(s) in the second control information, the packets after adding a predetermined header to each of the packets.

According to a fourth aspect, there is provided a network control method, comprising: determining whether to generate control information for packets forwarded in accordance with second control information from a forwarding node(s) that forwards packets by using first control information set by a control apparatus and the second control information for forwarding packets that do not match a matching condition(s) in the first control information set by the control apparatus from a predetermined port of the forwarding node(s); and requesting the control apparatus to generate control information based on a result of the determination. This method is associated with a certain machine, namely, with a computer that receives packets from the forwarding node(s) and determines whether to generate control information.

According to a fifth aspect, there is provided a program, causing a computer, which is arranged in a communication system comprising a control apparatus setting control information in a forwarding node(s) and a forwarding node(s) forwarding packets by using first control information set by the control apparatus and second control information for forwarding packets that do not match a matching condition(s) in the first control information set by the control apparatus from a predetermined port of the forwarding node(s), to perform processing for: determining whether to generate control information for the packets forwarded from the predetermined port of the forwarding node(s); and requesting the control apparatus to generate control information based on a result of the determination. This program can be recorded in a computer-readable (non-transient) storage medium. Namely, the present invention can be embodied as a computer program product.

The meritorious effects of the present invention are summarized as follows.

According to the present disclosure, even if a large amount of packet communication or fine-grained access control is performed, an increase in the load on a control apparatus and a switch can be suppressed and the control apparatus and the switch can be allowed to provide intended performance.

BRIEF DESCRIPTION OF THE DRAWINGS

FIG. 4 illustrates a flow entry (second control information) set in the switch according to the first exemplary embodiment of the present disclosure.

FIG. 5 illustrates access policies stored in a controller according to the first exemplary embodiment of the present disclosure.

FIG. 7 illustrates a flow entry set in the switch according to the first exemplary embodiment of the present disclosure in step S08 in FIG. 6.

FIG. 10 illustrates flow entries (second control information) set in a switch according to the second exemplary embodiment of the present disclosure.

PREFERRED MODES

Figure 1:
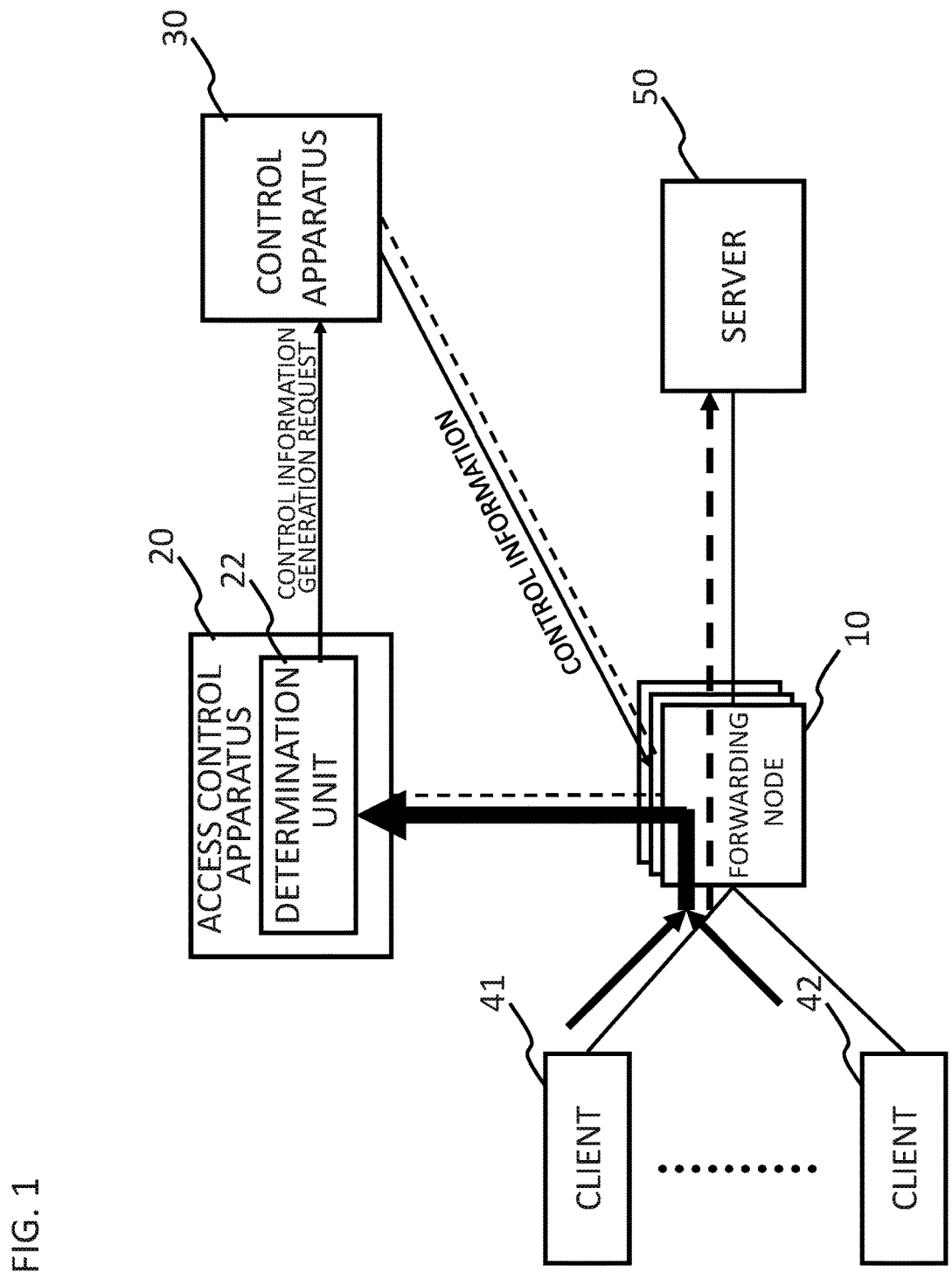
FIG. 1 illustrates a configuration according to an exemplary embodiment of the present disclosure.

First, an outline of an exemplary embodiment of the present disclosure will be described with reference to the drawings. In the following outline, various components are denoted by reference characters for the sake of convenience. Namely, the following reference characters are merely used as examples to facilitate understanding of the present disclosure, not to limit the present disclosure to the illustrated modes.

As illustrated in FIG. 1, an exemplary embodiment of the present disclosure can be realized by a configuration that includes a control apparatus 30 setting control information in a forwarding node(s) 10, one or plurality of forwarding nodes 10 forwarding packets by using control information set by the control apparatus 30, and an access control apparatus 20.

More specifically, the control apparatus 30 sets first control information for forwarding packets between predetermined external nodes (for example, between a client and a server in FIG. 1) and second control information for forwarding packets that do not match a matching condition(s) in the first control information from a predetermined port in the forwarding node(s) 10. The forwarding node(s) 10 forwards received packets by using the first and second control information.

The access control apparatus 20 includes a determination unit 22 that determines whether to generate control information for packets received from the predetermined port of the forwarding node(s) 10 (packets forwarded in accordance with the second control information). If necessary, the determination unit 22 requests the control apparatus to generate control information. Packets for which a control information generation request is not transmitted are dropped by the determination unit 22.

As described above, if packets are not forwarded in accordance with the first control information, which is set to forward packets between predetermined external nodes (for example, between a client and the server in FIG. 1), the packets are forwarded to the access control apparatus 20 (see a thick arrow in FIG. 1). In addition, the determination unit 22 of the access control apparatus 20 drops packets for which a control information generation request is not transmitted. As a result, the control apparatus 30 generates only the control information needed and sets the generated control information in the forwarding node(s) 10.

Thus, even if a large number of packets flow into the forwarding node(s) 10 or fine-grained access control is performed with many forwarding nodes 10, an increase in the load on the control apparatus 30 and the forwarding node(s) 10 can be suppressed.

[First Exemplary Embodiment]

Figure 2:
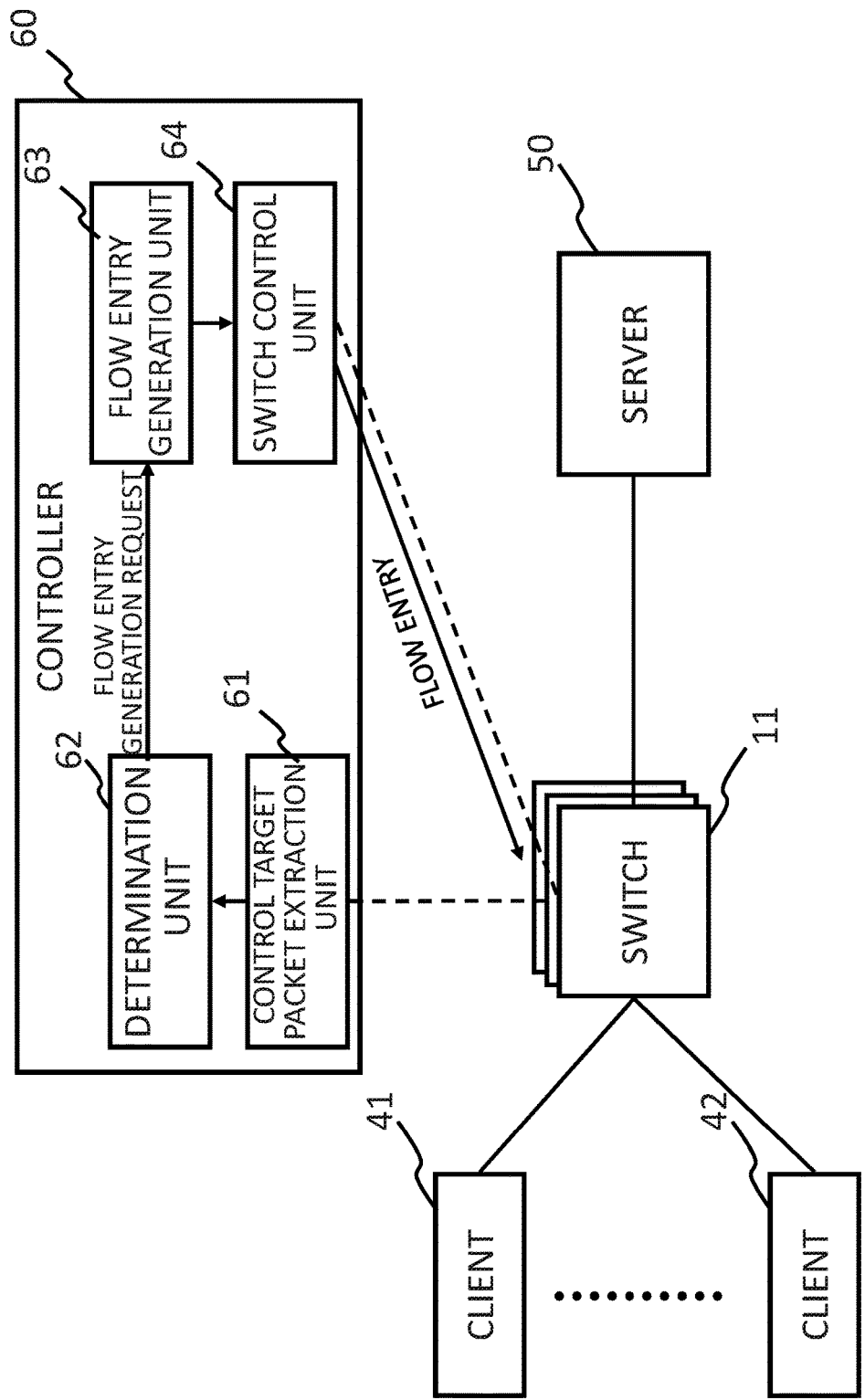
FIG. 2 illustrates a configuration of a communication system according to a first exemplary embodiment of the present disclosure.

Next, a first exemplary embodiment of the present disclosure will be described in detail with reference to the drawings. FIG. 2 illustrates a configuration of a communication system according to the first exemplary embodiment of the present disclosure. As illustrated in FIG. 2, the communication system includes a plurality of switches 11 arranged in a network, a controller 60 controlling these switches 11, and clients 41 and 42 and a server 50 connected to the network in which the switches 11 are arranged.

The switches 11 process packets in accordance with flow entries set by the controller 60.

Figure 3:
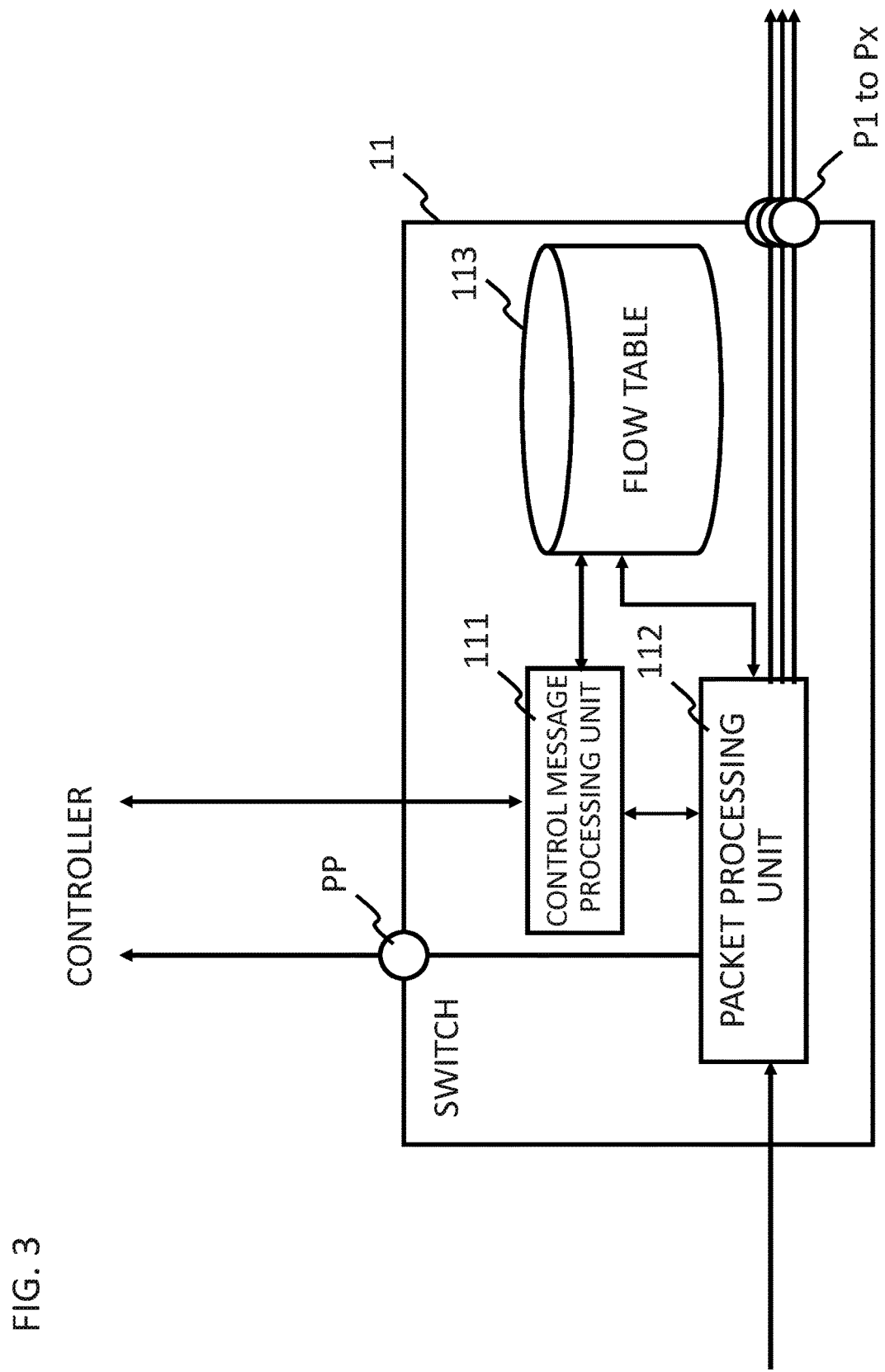
FIG. 3 illustrates a configuration of a switch according to the first exemplary embodiment of the present disclosure.

FIG. 3 illustrates a configuration of one of the switches according to the first exemplary embodiment of the present disclosure. As illustrated in FIG. 3, each of the switches 11 according to the present exemplary embodiment includes a control message processing unit 111, a packet processing unit 112, and a flow table 113. In addition, ports P1 to Px in FIG. 3 are connected to other switches and the server 50. A port PP is connected to a control target packet extraction unit 61 of the controller 60.

The flow table 113 stores flow entries set by the controller 60. In a flow entry, matching conditions (Match Fields) that are matched against received packets are associated with a processing content (Instructions).

When receiving a packet, the packet processing unit 112 searches the flow table 113 for a flow entry having a matching condition(s) that matches the received packet. If, as a result of the search, the packet processing unit 112 finds a flow entry having a matching condition(s) that matches the received packet, the packet processing unit 112 performs a processing content (Instructions) set in the flow entry.

The control message processing unit 111 exchanges control messages with the controller 60. For example, the control message processing unit 111 performs addition, modification, and deletion of flow entries in the flow table 113 in accordance with control messages from the controller 60.

FIG. 4 illustrates a flow entry (second control information) set by default in a switch 11. In the flow entry illustrated in FIG. 4, as matching conditions, a wildcard (ANY) is set in each field of a source IP address (Src IP), a destination IP address (Dst IP), and a TCP/UDP (Transmission Control Protocol/User Datagram Protocol) destination port (dst port). In addition, a processing content (Instructions) for forwarding packets to the control target packet extraction unit 61 of the controller 60 is set. Thus, if the flow entry in FIG. 4 alone is set, all received packets are forwarded to the control target packet extraction unit 61 of the controller 60.

In addition, a statistical information (Counters) field is included in the flow entry in FIG. 4 so that statistical information can be recorded per flow entry. The statistical information can be provided to the controller 60 via the control message processing unit 111. For example, the statistical information can be used for determining abnormal traffic.

Such flow entry illustrated in FIG. 4 may be preset in the switch 11 or may be set by the controller 60 when the switch 11 is connected to the network.

As the switch 11 described above, an OpenFlow switch in Non-Patent Literatures 1 and 2 can be used. In addition, the above packet processing unit 112 and the flow table can have a hardware configuration by using an ASIC (Application Specific Integrated Circuit) so that flow entry search and various processing can be performed at high speed.

The following description assumes that the clients 41 and 42 communicate with the server 50. However, other communication devices may additionally be included. In addition, for example, devices used as the clients 41 and 42 may include functions equivalent to those of the above switches 11. In such cases, when packets are outputted from applications in these devices, the equivalent functions are allowed to operate to process the packets in the same way as the switches 11.

The controller 60 includes the control target packet extraction unit 61, a determination unit 62, a flow entry generation unit 63, and a switch control unit 64.

The control target packet extraction unit 61 operates in the same way as a promiscuous mode of a network card and receives all packets forwarded from the switches 11 on the basis of a default flow entry (second control information) as described above. In addition, the control target packet extraction unit 61 refers to header information of the received packets, extracts control target packets, and outputs the extracted control target packets to the determination unit 62. Selection criteria for control target packets are defined on the basis of assumed traffic contents and capabilities of the controller 60. For example, only packets whose VLAD ID value is within a predetermined range may be forwarded to the determination unit 62. Alternatively, all packets may be forwarded to the determination unit 62 except those having a feature(s) that may cause abnormal traffic or unauthorized access.

For example, on the basis of a predetermined access policy, the determination unit 62 determines whether to generate a flow entry for a packet forwarded from the control target packet extraction unit 61. As a result of the determination, if the determination unit 62 determines that a flow entry needs to be generated, the determination unit 62 transmits the received packet or information extracted from the received packet to the flow entry generation unit 63 and requests the flow entry generation unit 63 to generate a flow entry. In contrast, if, as a result of the determination, the determination unit 62 determines that a flow entry does not need to be generated, the determination unit 62 drops the received packet.

FIG. 5 illustrates access policies to which the determination unit 62 refers to determine whether to generate a flow entry. In the example in FIG. 5, since access authority represents "allow" for packets whose source IP address is 192.168.100.1 and whose destination IP address is 192.168.0.1, the determination unit 62 determines that a flow entry needs to be generated for these packets. In contrast, since access authority represents "deny" for packets whose source IP address is 192.168.100.2 and whose destination IP address is 192.168.0.1, the determination unit 62 determines that a flow entry does not need to be generated for these packets. In the example in FIG. 5, only the IP addresses are used for the determination. However, for example, header information or protocol information in layer 2 or 4 may be used for the determination.

When receiving a flow entry generation request from the determination unit 62, the flow entry generation unit 63 refers to a network topology configured by the switches 11, calculates a path for forwarding the received packet from a source address to a destination address, and generates flow entries to cause relevant switches 11 to forward the received packet on the calculated path. For example, when receiving a flow entry generation request from the client 42 in FIG. 1 for a packet addressed to the server 50, the flow entry generation unit 63 generates flow entries that causes relevant switches 11 to forward the packet addressed to the server 50 from the client 42 to the next hop on the forwarding path.

The switch control unit 64 sets these flow entries generated by the flow entry generation unit 63 in the respective switches 11. The switch control unit 64 may be configured to store a flow entry database or the like that manages flow entries set in each of the switches 11 and to determine whether to set flow entries generated by the flow entry generation unit 63 in the respective switches 11.

The above controller 60 can be realized by adding functions equivalent to those of the control target packet extraction unit 61 and the determination unit 62 to the OpenFlow controller in Non-Patent Literatures 1 and 2.

Each unit (processing means) in the access control apparatus, the controller, and the switches illustrated in FIGS. 1 to 3 can be realized by a computer program that causes a computer mounted in these components to use hardware of the computer and to perform each of the above processes.

Figure 6:
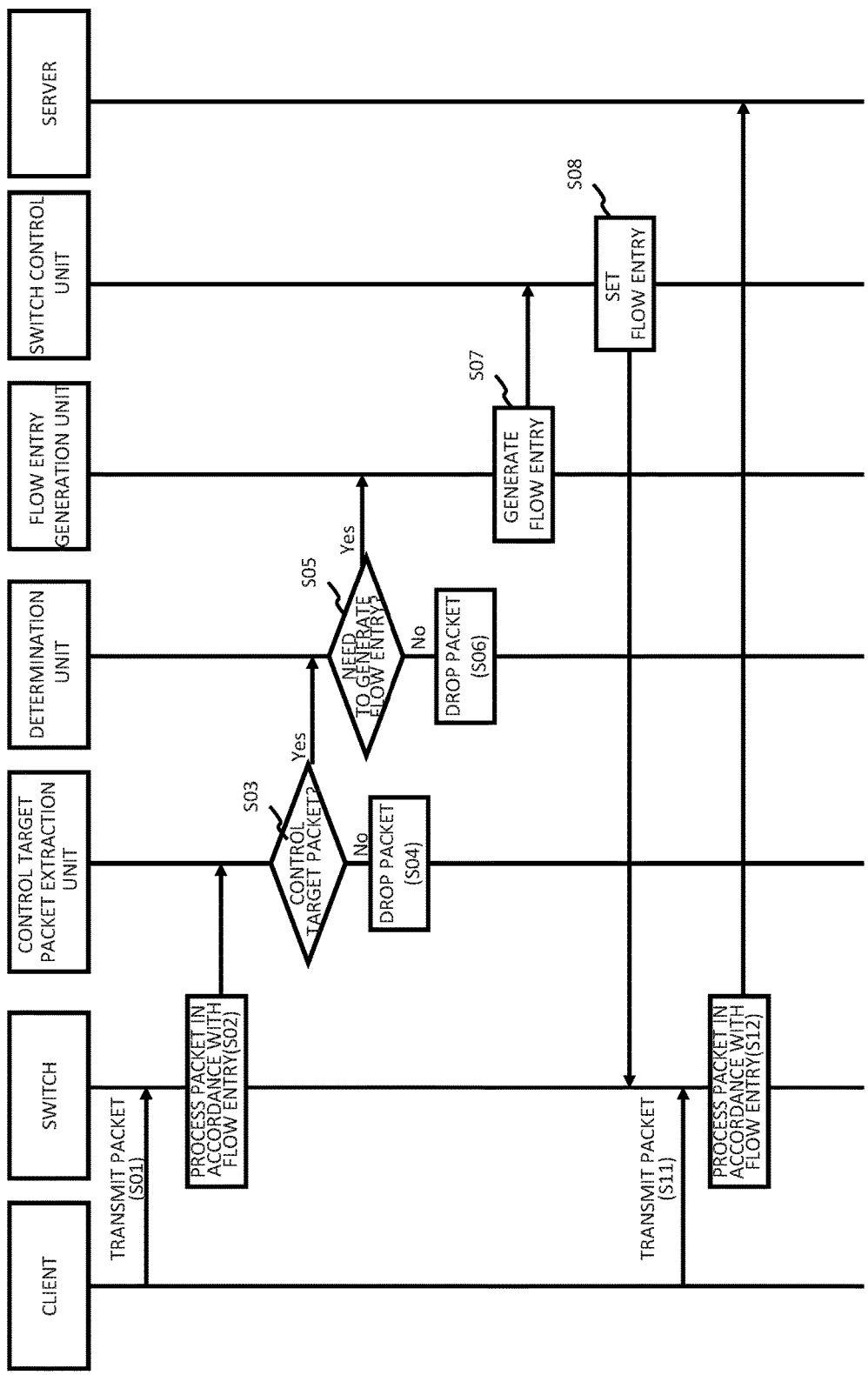
FIG. 6 is a sequence diagram illustrating an operation according to the first exemplary embodiment of the present disclosure.

Next, an operation according to the present exemplary embodiment will be described in detail with reference to the drawings. FIG. 6 is a sequence diagram illustrating an operation according to the first exemplary embodiment of the present disclosure. Hereinafter, a series of operations in which the client 42 transmits packets to the server 50 will be described.

First, as illustrated in FIG. 6, the client 42 transmits a packet addressed to the server 50 (step S01). Next, a switch 11 refers to its own flow table 113 and processes the packet in accordance with a flow entry that matches the received packet (step S02). In this example, the flow entry (second control information) illustrated in FIG. 4 matches the received packet. The switch 11 forwards the packet to the control target packet extraction unit 61 of the controller 60 in accordance with the content of the flow entry (second control information).

When receiving the packet, the control target packet extraction unit 61 of the controller 60 determines whether the packet is a control target packet (step S03). The following description assumes that the control target packet extraction unit 61 determines that the packet addressed to the server 50 from the client 42 is a control target packet. Thus, the packet addressed to the server 50 from the client 42 is transmitted to the determination unit 62 (Yes in step S03). If the control target packet extraction unit 61 determines that the packet is not a control target packet in step S03 (No in step S03), the control target packet extraction unit 61 drops this packet (step S04).

Next, when receiving the control target packet, the determination unit 62 of the controller 60 determines whether to generate a flow entry (step S05). The following description assumes that the determination unit 62 determines that a flow entry needs to be generated for the packet addressed to the server 50 from the client 42 in accordance with the access policies in FIG. 5. Thus, the determination unit 62 of the controller 60 requests the flow entry generation unit 63 to generate a flow entry (Yes in step S05). If the determination unit 62 determines that a flow entry does not need to be generated in step S05 (No in step S05), the determination unit 62 drops this packet (step S06).

Next, when receiving a flow entry generation request, the flow entry generation unit 63 of the controller 60 calculates a forwarding path for the packet, generates a flow entry to be set in each of the switches including the switch 11 on the forwarding path, and transmits the flow entries to the switch control unit 64 (step S07).

Next, the switch control unit 64 of the controller 60 sets the generated flow entries in the respective switches on the forwarding path (step S08). In addition, the switch control unit 64 instructs the switch 11 to transmit the received packet to a next hop or to search the flow table again. In this way, the packet received in step S01 is forwarded to the next hop.

FIG. 7 illustrates a flow entry (first control information) set in the above step S08. A flow entry for forwarding packets addressed to the server 50 (IP address=192.168.0.1) from the client 42 (IP address=192.168.100.1) to a next hop is set in a position having a higher priority than that of the flow entry (second control information) illustrated in FIG. 4. Namely, the switch 11 searches the flow table 113 sequentially from the top entry. If the switch 11 finds a flow entry having a matching condition(s) that matches a received packet, the switch 11 selects the flow entry. In FIG. 7, a flow entry in a higher position has a higher priority. However, alternatively, a priority information field may be set in each flow entry. In this way, the priorities of flow entries having a matching condition(s) that matches a received packet are compared with each other, and a flow entry having the highest priority is selected.

Next, when the client 42 transmits subsequent packets to the switch 11 (step S11), the switch 11 forwards these packets in accordance with the flow entry set in step S08 (first control information). The subsequent forwarding operation is performed at high speed without requiring the access control apparatus 20 and the controller 60. A flow entry for allowing communication of reply packets from the server 50 to the client 42 is set in accordance with a procedure similar to the above procedure.

If the client 41 in FIG. 1 transmits a packet to the server 50, the switch 11 forwards the packet to the access control apparatus 20 as in the above flow. However, in this case, the access control apparatus 20 causes the control target packet extraction unit 61 or the determination unit 62 to drop the packet (namely, the control target packet extraction unit 61 determines that the packet is not a control target packet or the determination unit 62 determines that a flow entry does not need to be generated). In such cases, since no flow entry generation request is issued to the flow entry generation unit 63 of the controller 60, no load is placed thereon.

Figure 8:
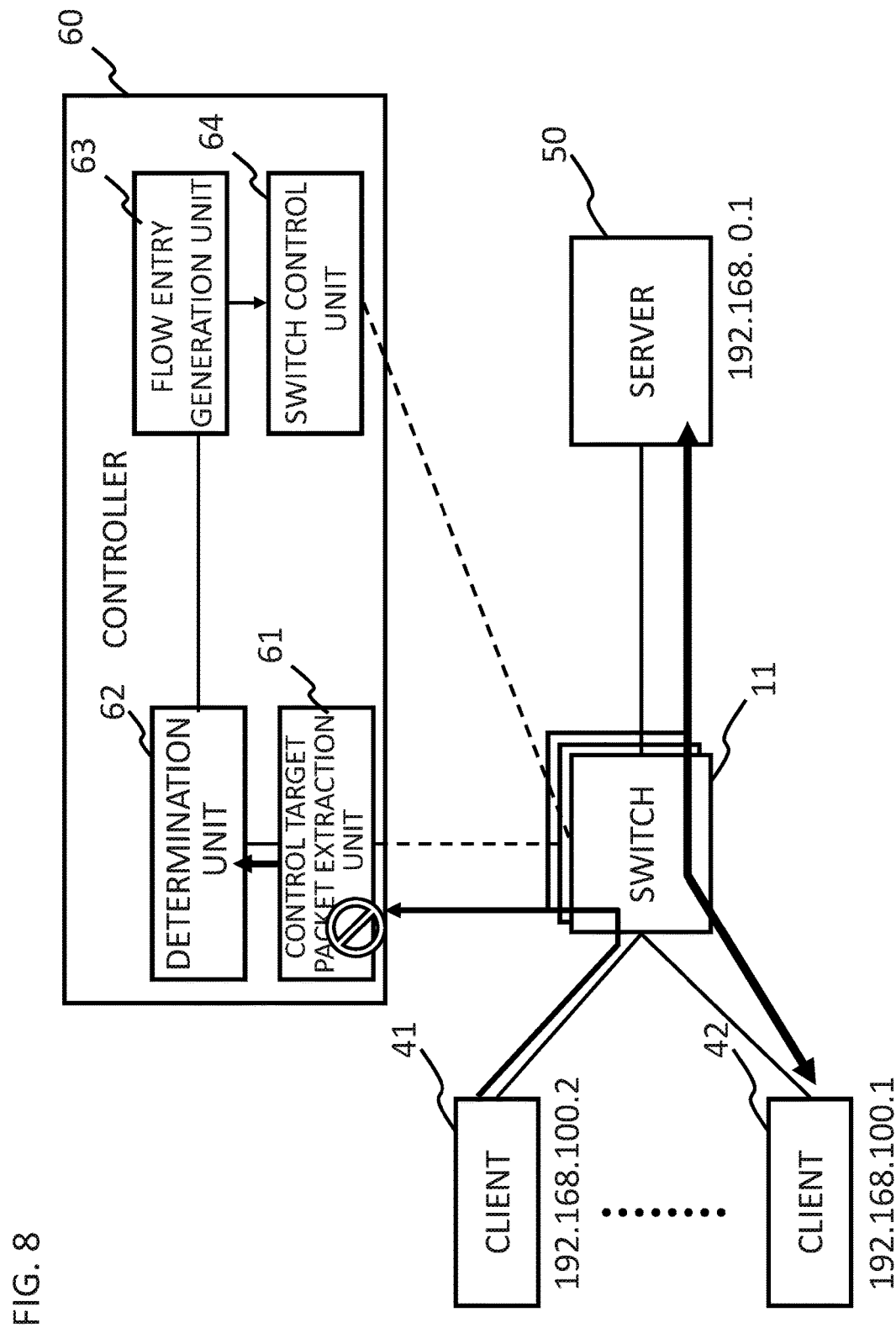
FIG. 8 is a diagram in which packet forwarding paths are added to FIG. 2.

FIG. 8 illustrates packet forwarding paths realized by the above flow entry setting procedure. Packets between the client 42 and the server 50 are forwarded on a path indicated by a thick arrow in FIG. 8 in accordance with the flow entry (first control information; the flow entry for packet forwarding from the server 50 to the client 42 is omitted) illustrated in FIG. 7. In contrast, packets from the client 41 are forwarded to the control target packet extraction unit 61 or the determination unit 62 as indicated by a thin arrow in the FIG. 8 and are dropped in accordance with the flow entry (second control information) illustrated in FIG. 4 and in the lower section of FIG. 7.

Thus, even when a large number of packets are forwarded from the client 41 to the switch 11, excessive load is not placed on the controller 60. In addition, even if the number of clients or switches is increased, since packets are sorted by the control target packet extraction unit 61 and the determination unit 62, the load on the controller 60 can be suppressed.

In the above first exemplary embodiment, the controller 60 includes the control target packet extraction unit 61 and the determination unit 62. However, as illustrated in FIG. 1, the control target packet extraction unit and the determination unit 62 may be arranged in a different information processing apparatus (an access control apparatus), which is arranged separately from the controller (the control apparatus). In this way, by increasing the number of information processing apparatuses (the access control apparatuses), load balancing can be achieved.

[Second Exemplary Embodiment]

Next, a second exemplary embodiment will be described. In the second exemplary embodiment, a plurality of information processing apparatuses (access control apparatuses) are arranged to achieve load balancing.

Figure 9:
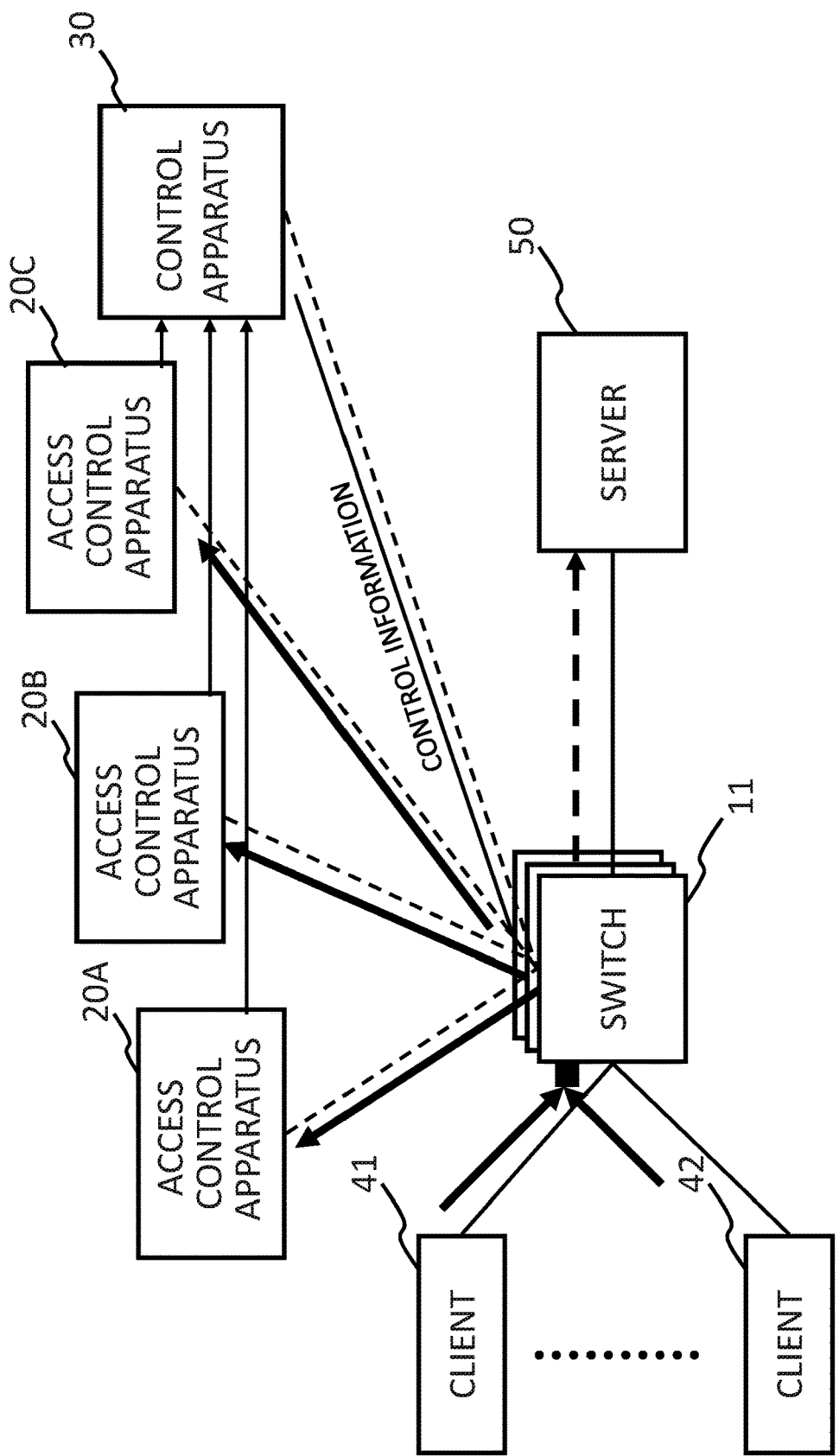
FIG. 9 illustrates a configuration of a communication system according to a second exemplary embodiment of the present disclosure.

FIG. 9 illustrates a configuration of a communication system according to the second exemplary embodiment of the present disclosure. The second exemplary embodiment differs from the exemplary embodiments illustrated in FIGS. 1 and 2 in that a plurality of access control apparatuses 20A to 20C are arranged, each of which includes the control target packet extraction unit 61 and the determination unit 62 and receives packets from the switches 11. Since each operation of the access control apparatuses 20A to 20C is the same as that of the control target packet extraction unit 61 and the determination unit 62 of the controller 60 in the first exemplary embodiment, description thereof will be omitted.

FIG. 10 illustrates flow entries (second control information) set in a switch 11 according to the present exemplary embodiment. These flow entries differ from the flow entry (second control information) illustrated in FIG. 4 in that a plurality of flow entries (second control information) are set for switching access control apparatuses, to which packets are transmitted, in accordance with a feature(s) of a received packet. In the example in FIG. 10, if packets transmitted from the client 42 match a flow entry (second control information) that instructs packet forwarding to an access control apparatus (packets that do no match any first control information), the packets are forwarded to the access control apparatus 20A. If packets transmitted from other clients match a flow entry (second control information) that instructs packet forwarding to an access control apparatus (packets that do no match any first control information), the packets are forwarded to the access control apparatus 20B.

Thus, according to the present exemplary embodiment, as illustrated in FIG. 9, the load required for processing a large number of packets forwarded from the switches 11 (packets that do not match any first control information) can be distributed to and shared by the plurality of access control apparatuses 20A to 20C. In FIG. 9, each switch 11 is connected to each of the access control apparatuses 20A to 20C by a single link. However, each switch 11 and the access control apparatus 20A to 20C can be connected by ring aggregation integrating a plurality of links. For example, high-performance access control apparatuses connected by ring aggregation may be configured to process flows that are predicted to require large amounts of packet processing.

[Third Exemplary Embodiment]

Next, a third exemplary embodiment will be described. In the third exemplary embodiment, switches 11 and an access control apparatus are connected to each other via another network. Even in this configuration, packets (packets that do no match any first control information) can be forwarded to the access control apparatus.

Figure 11:
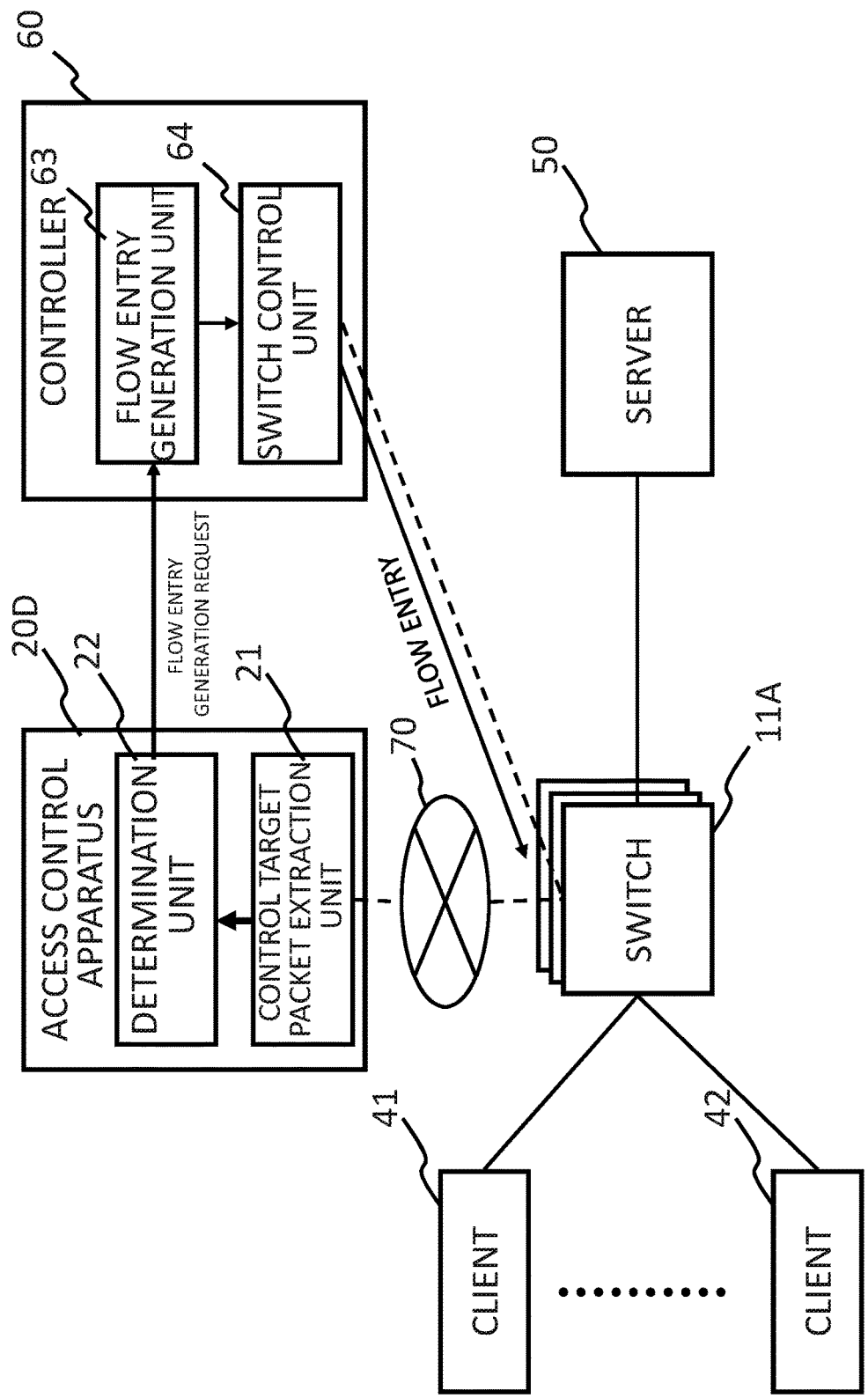
FIG. 11 illustrates a configuration of a communication system according to a third exemplary embodiment of the present disclosure.

FIG. 11 illustrates a configuration of a communication system according to the third exemplary embodiment of the present disclosure. As illustrated in FIG. 11, when switches 11A and an access control apparatus 20D are arranged away from each other, for example, a mechanism for forwarding packets (packets that do no match any first control information) addressed to the server 50 to the access control apparatus is needed. Thus, according to the present exemplary embodiment, a modification has been made to each of the switches.

Figure 12:
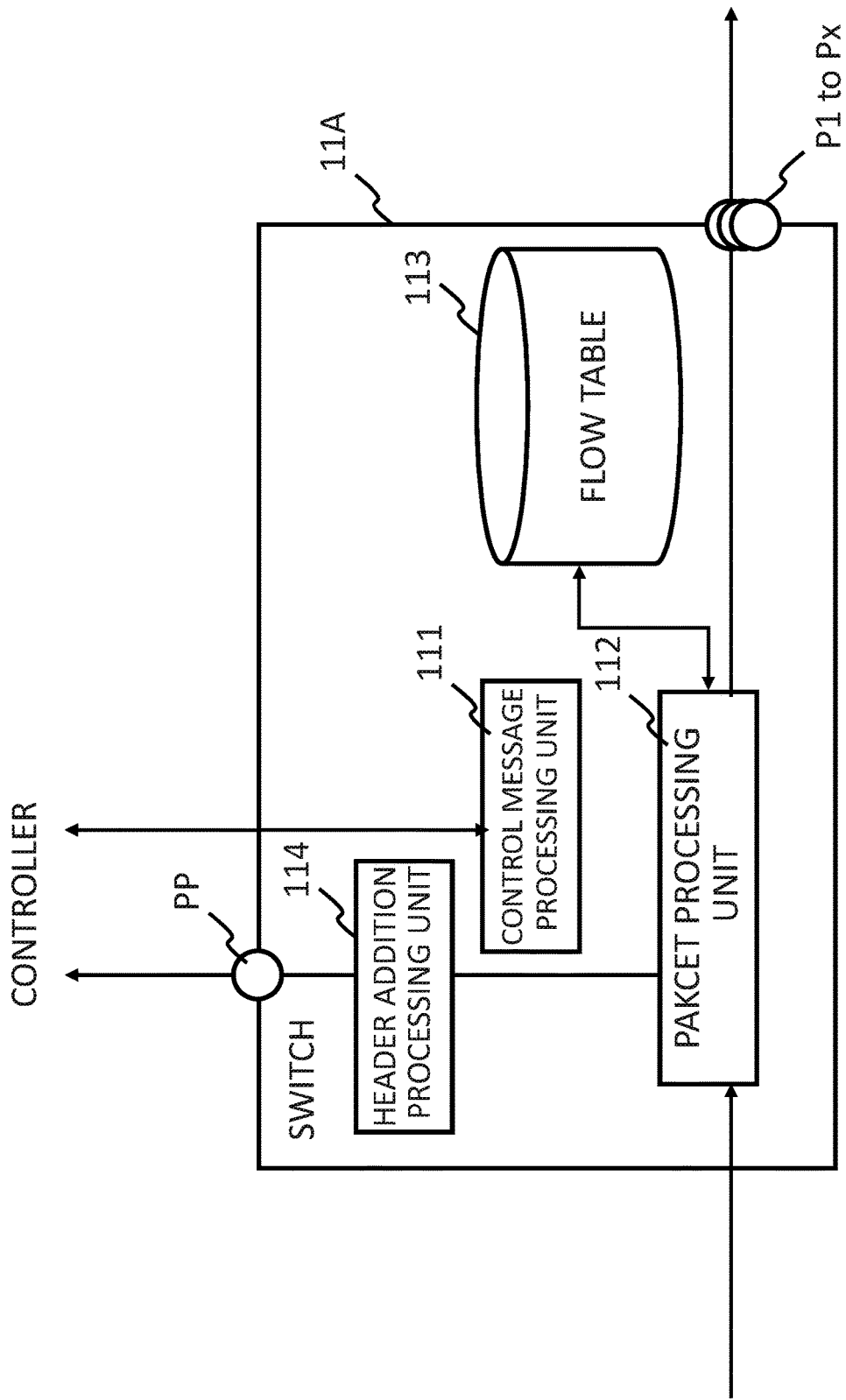
FIG. 12 illustrates a configuration of a switch according to the third exemplary embodiment of the present disclosure.

FIG. 12 illustrates a configuration of a switch 11A according to the third exemplary embodiment of the present disclosure. Each switch 11A differs from each switch 11 according to the first exemplary embodiment illustrated in FIG. 3 in that the switch 11A includes a header addition processing unit 114 for adding an additional header to each packet that is transmitted to the access control apparatus 20D.

The header addition processing unit 114 adds a header including a data path ID (DPID; an identifier of the switch 11A) and information about an address of the access control apparatus 20D to each packet forwarded from the packet processing unit 112 and outputs the packet to the port PP.

Thus, according to the present exemplary embodiment, as illustrated in FIG. 11, even when the switches 11A and the access control apparatus 20D are arranged away from each other, packet (packets that do no match first control information) can be forwarded to the access control apparatus.

In addition, according to the present exemplary embodiment, since the data path ID (DPID; an identifier of the switch 11A) is included in the additional header, the access control apparatus 20D can identify the switch that has transmitted the packets (packets that do no match first control information).

While exemplary embodiments of the present disclosure have thus been described, the present invention is not limited thereto. Further variations, substitutions, or adjustments can be made without departing from the basic technical concept of the present invention. For example, the network configurations and the number of switches, access control apparatuses, and controllers described in the above exemplary embodiments are not limited.

Figure 13:
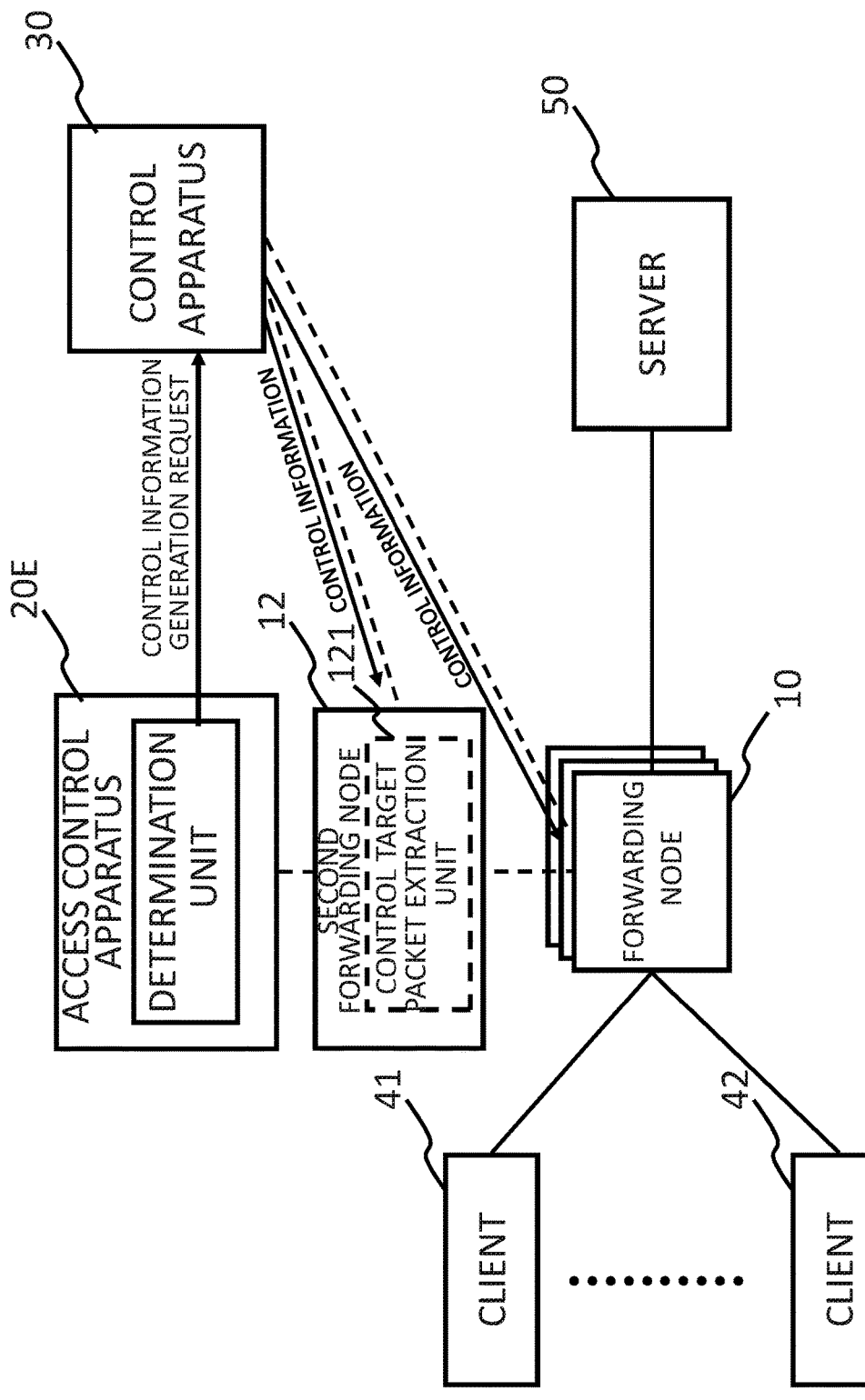
FIG. 13 illustrates a configuration of a communication system according to a fourth exemplary embodiment of the present disclosure.

In addition, in the above first to third exemplary embodiments, the control target packet extraction unit is included in the access control apparatus 20 or the controller. However, alternatively, as illustrated in FIG. 13, a control target packet extraction unit may be configured by a forwarding node (a second forwarding node) 12 such as an OpenFlow switch in Non-Patent Literatures 1 and 2 (a fourth exemplary embodiment). In this case, a control apparatus or a controller sets control information (a flow entry) for extracting the control target packets in the forwarding node (the second forwarding node) so that the forwarding node (the second forwarding node) 12 can serve as the control target packet extraction unit.

In addition, in the above first exemplary embodiment, separate channels are arranged for paths between a switch and the control target packet extraction unit 61 and between the switch and the switch control unit 64. However, alternatively, each switch may use a single channel to transmit packets (packets that do not match any first control information) and control messages between the switch and the controller. For example, a secure channel arranged between an OpenFlow switch and the OpenFlow controller in Non-Patent Literatures 1 and 2 may also be used.

In addition, in the above exemplary embodiments, the determination unit 62 determines whether to generate a flow entry in accordance with an access policy. However, alternatively, a packet analysis function may be added to the determination unit 62. For example, the packet analysis function analyzes packets forwarded from the control target packet extraction unit 61. If the number of forwarded packets having the same source IP address reaches a predetermined threshold (N) or more in a predetermined period, the determination unit 62 determines that these packets are unauthorized packets transmitted by a DDoS attack (Distributed Denial of Service attack). Next, the determination unit 62 transmits the received packet or information extracted from the received packet to the flow entry generation unit 63 and requests the flow entry generation unit 63 to generate a flow entry for dropping the packets having the same source IP address. In this way, the number of packets to be forwarded to the control target packet extraction unit 61 can be reduced.

In the present invention, the following modes are possible.

[First Mode]

See the communication system in the first aspect above.

[Second Mode]

Preferably, the access control apparatus further comprises a control target packet extraction unit extracting control target packets that are transmitted to the determination unit from the packets forwarded from the predetermined port of the forwarding node(s).

[Third Mode]

Preferably, the forwarding node(s) further comprises a header addition processing unit adding a header for forwarding to the access control apparatus to each of the packets to be forwarded from the predetermined port.

[Fourth Mode]

Preferably, the communication system comprising: a plurality of access control apparatuses each of which corresponds to the access control apparatus; wherein a plurality of items of control information for sorting packets into the plurality of access control apparatuses are set as the second control information.

[Fifth Mode]

Preferably, the determination unit determines whether to generate control information on the basis of a predetermined access policy.

[Sixth Mode]

Preferably, when the packets forwarded from the predetermined port of the forwarding node(s) have a predetermined feature(s), the determination unit requests the control apparatus to generate control information for causing the forwarding node(s) to drop the packets having the feature(s).

[Seventh Mode]

Preferably, the control target packet extraction unit is configured by a second forwarding node controlled by the control apparatus.

[Eighth Mode]

See the access control apparatus in the second aspect above.

[Ninth Mode]

See the forwarding node in the third aspect above.

[Tenth Mode]

See the network control method in the fourth aspect above.

[Eleventh Mode]

See the computer program in the fifth aspect above.

Constituent elements or steps of the access control apparatus, forwarding node, network control method and the computer program can be similarly extended to modes 2 to 7, as in the communication system according to mode 1.

The disclosure of the above Patent Literature and Non-Patent Literatures is incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements (including the elements in each of the claims, exemplary embodiments or examples, drawings, etc.) are possible within the scope of the claims of the present invention. That is, the present invention of course includes various variations and modifications that could be made by those skilled in the art according to the overall disclosure including the claims and the technical concept.

REFERENCE SIGNS LIST forwarding node
11, 11A switch
12 second forwarding node
20, 20A to 20E access control apparatus
21, 61, 121 control target packet extraction unit
22, 62 determination unit
30 control apparatus
41, 42 client
50 server
60 controller
63 flow entry generation unit
64 switch control unit
111 control message processing unit
112 packet processing unit
113 flow table
114 header addition processing unit
P1 to Px, PP port

What is claimed is:

1. A communication system, comprising:
a control apparatus configured to set control information in a forwarding node;
a forwarding node for forwarding packets by using first control information set by the control apparatus and second control information for forwarding packets that do not match a matching condition in the first control information set by the control apparatus from a predetermined port of the forwarding node; and
an access control apparatus comprising a determination unit, implemented by at least one processor, configured to determine whether or not to generate control information for the packets forwarded from the predetermined port of the forwarding node,
wherein, when the packets forwarded from the predetermined port of the forwarding node have a predetermined feature, the determination unit is further configured to request the control apparatus to generate control information for causing the forwarding node to drop the packets having the predetermined feature.

2. The communication system according to claim 1, wherein the access control apparatus further comprises a control target packet extraction unit, implemented by the at least one processor, configured to extract control target packets, the control target packets being transmitted to the determination unit from the packets forwarded from the predetermined port of the forwarding node.

3. The communication system according to claim 2, wherein the control target packet extraction unit is configured by a second forwarding node controlled by the control apparatus.

4. The communication system according to claim 2, wherein the forwarding node further comprises a header addition processing unit, implemented by the at least one processor, configured to add a header, for forwarding to the access control apparatus, to each of the packets to be forwarded from the predetermined port.

5. The communication system according to claim 2, comprising: a plurality of access control apparatuses each of which corresponds to the access control apparatus; wherein control information used for sorting packets into the plurality of access control apparatuses is set as the second control information.

6. The communication system according to claim 2, wherein the determination unit is further configured to determine whether or not to generate control information using a predetermined access policy.

7. The communication system according to claim 1, wherein the forwarding node further comprises a header addition processing unit, implemented by the at least one processor, configured to add a header, for forwarding to the access control apparatus, to each of the packets to be forwarded from the predetermined port.

8. The communication system according to claim 7, comprising:
a plurality of access control apparatuses each of which corresponds to the access control apparatus;
wherein control information used for sorting packets into the plurality of access control apparatuses is set as the second control information.

9. The communication system according to claim 7, wherein the determination unit is further configured to determine whether or not to generate control information using a predetermined access policy.

10. The communication system according to claim 1, further comprising:
a plurality of access control apparatuses, each of which corresponds to the access control apparatus;
wherein control information used for sorting packets into the plurality of access control apparatuses is set as the second control information.

11. The communication system according to claim 10, wherein the determination unit is further configured to determine whether or not to generate control information using a predetermined access policy.

12. The communication system according to claim 1, wherein the determination unit is further configured to determine whether or not to generate control information using a predetermined access policy.

13. An access control apparatus,
arranged in a communication system that includes a control apparatus for setting control information in a forwarding node; and a forwarding node forwarding packets by using first control information set by the control apparatus and second control information for forwarding packets that do not match a matching condition in the first control information set by the control apparatus from a predetermined port of the forwarding node,
the access control apparatus comprising a determination unit, implemented by at least one processor, configured to determine whether or not to generate control information for the packets forwarded from the predetermined port of the forwarding node,
wherein, when the packets forwarded from the predetermined port of the forwarding node have a predetermined feature, the determination unit is further configured to request the control apparatus to generate control information for causing the forwarding node to drop the packets having the predetermined feature.

14. A forwarding node,
connected to a control apparatus configured to set control information in the forwarding node, wherein
first control information set by the control apparatus and second control information are set, the second control information being for forwarding packets that do not match a matching condition in the first control information set by the control apparatus from a predetermined port of the forwarding node, and wherein
the forwarding node forwards, when receiving packets that match a matching condition in the second control information, the packets after adding a predetermined header to each of the packets,
wherein, when the packets forwarded from the predetermined port of the forwarding node have a predetermined feature, the control apparatus is requested to generate control information for causing the forwarding node to drop the packets having the predetermined feature.

15. A network control method, comprising:
determining whether or not to generate control information for packets forwarded in accordance with second control information from a forwarding node that forwards packets by using first control information set by a control apparatus and the second control information for forwarding packets that do not match a matching condition in the first control information set by the control apparatus from a predetermined port of the forwarding node,
wherein, when the packets forwarded from the predetermined port of the forwarding node have a predetermined feature, requesting the control apparatus to generate control information for causing the forwarding node to drop the packets having the predetermined feature.

16. A non-transitory computer-readable storage medium storing a program, causing a computer, which is arranged in a communication system comprising a control apparatus for setting control information in a forwarding node and a forwarding node forwarding packets by using first control information set by the control apparatus and second control information for forwarding packets that do not match a matching condition in the first control information set by the control apparatus from a predetermined port of the forwarding node, to perform processing for:
determining whether or not to generate control information for the packets forwarded from the predetermined port of the forwarding node,
wherein, when the packets forwarded from the predetermined port of the forwarding node have a predetermined feature, requesting the control apparatus to generate control information for causing the forwarding node to drop the packets having the predetermined feature.

* * * * *